United States Patent
Ylitalo et al.

(10) Patent No.: US 6,980,832 B1
(45) Date of Patent: Dec. 27, 2005

(54) METHOD OF REDUCING TRANSMISSION POWER IN A WIRELESS COMMUNICATION SYSTEM

(75) Inventors: Juha Ylitalo, Oulu (FI); Roman Pichna, Nokia Group (FI)

(73) Assignee: Nokia Corporation, Espoo (FI)

(*) Notice: Subject to any disclaimer, the term of this patent is extended or adjusted under 35 U.S.C. 154(b) by 464 days.

(21) Appl. No.: 10/129,712

(22) PCT Filed: Nov. 6, 2000

(86) PCT No.: PCT/EP00/10980

§ 371 (c)(1),
(2), (4) Date: Sep. 4, 2002

(87) PCT Pub. No.: WO01/39393

PCT Pub. Date: May 31, 2001

(30) Foreign Application Priority Data

Nov. 8, 1999 (GB) .................................. 9926438

(51) Int. Cl.⁷ ............................................. H04K 3/00

(52) U.S. Cl. ................. 455/562; 455/427; 455/12.1; 455/63; 455/67.3

(58) Field of Search ............... 455/522, 69, 127.1, 455/127.5

(56) References Cited

U.S. PATENT DOCUMENTS

| | | | | |
|---|---|---|---|---|
| 5,812,947 A | * | 9/1998 | Dent | 455/427 |
| 5,884,166 A | | 3/1999 | Ray et al. | 455/431 |
| 6,161,013 A | * | 12/2000 | Anderson et al. | 455/437 |
| 6,418,327 B1 | * | 7/2002 | Carey et al. | 455/562.1 |
| 6,560,209 B1 | * | 5/2003 | Alamouti et al. | 370/330 |

FOREIGN PATENT DOCUMENTS

| | | | | |
|---|---|---|---|---|
| EP | 0 902 551 A | 3/1990 | | H04B 7/02 |
| WO | WO 98 59433 A | 12/1998 | | H04B 7/005 |
| WO | WO 99 31820 A | 6/1999 | | H04B 7/08 |

* cited by examiner

*Primary Examiner*—Nick Corsaro
*Assistant Examiner*—Michael Chu
(74) *Attorney, Agent, or Firm*—Cohen, Pontani, Lieberman & Pavane (57) ABSTRACT

In the described system, one or more base stations transmit a signal to a mobile station. The signal is transmitted using polarisation diversity, whereby the signal is transmitted in one direction using two signal beams, each signal beam being differently polarised. A method of beam-hoping may be employed whereby the polarisation of the transmitted beams during hand off is varied according to predefined sequence. The sequence may be determined according to the data loading within the respective transmission cells. Also disclosed is a method of soft or softer hand off within a wireless communication system where the total number of signal beams transmitted from two base stations to a single mobile station during hand off is kept constant.

49 Claims, 3 Drawing Sheets

METHOD OF REDUCING TRANSMISSION POWER IN A WIRELESS COMMUNICATION SYSTEM

PRIORITY CLAIM

This is a national stage of PCT application No. PCT/EP00/10980, filed on Nov. 6, 2000. Priority is claimed on that application, and on patent application No. 9926438.4 filed in Great Britain on Nov. 8, 1999.

FIELD OF THE INVENTION

This invention relates to a directional wireless communication system and a method of directional wireless communication using such a system.

BACKGROUND OF THE INVENTION

A number of different access methods an which wireless cellular communication networks are based are known. In a typical wireless cellular network, the area covered by a cellular network is divided into a plurality of cells or cell sectors. Each cell is served by a base station which transmits signals to, and receives signals from, mobile stations located in the cell or cell sector associated with the respective base station. In a system using antenna arrays with analogue or digital beamforming, the base transceiver station will not transmit signals intended for a given mobile station throughout the cell or cell sector but will only transmit the signal in one or more beam directions from which a signal from the mobile station is received. In other words, a signal intended for a given mobile station is not transmitted throughout the cell or cell sector but rather only to the part of the cell or cell sector in which the mobile station is located.

As the signal, which is transmitted by the base transceiver, station is usually only be transmitted in a particular direction, the resulting transmission may have a relatively narrow angular spread with the transmission power concentrated into that narrow angular spread. This results in a better signal to noise ratio. Additionally, as a result of the directionality of the base transceiver station, an improvement in the signal to interference ratio of the signal received by the base transceiver can be achieved. The interference caused to other mobile stations in the same cell or adjacent cells by the signal transmitted by the base station to the mobile station is also reduced. This increases the capacity of the system and/or increases the quality of communications.

A signal from the base transceiver station to a mobile station will generally follow several different paths. Those pluralities of paths are generally referred to as multi-path. As each multi-path follows a different route from the base transceiver station to the mobile station, the length of each multi-path differs. Consequently a signal following a first multi-path will arrive at the mobile station at a different time from a signal following a second multi-path. The signals received via each of the multi-paths may be out of phase with respect to each other at the mobile station. If the signals are out of phase with respect to each other, it is possible that these signals may interfere with each other destructively, thereby reducing the signal to noise ratio of the transmitted signal transmitted by the base station: In other words, due to this destructive interference, the signal may not be received successfully by the mobile station.

It has been proposed to use beam diversity in systems using beamforming techniques to address the difficulties caused by multi-path interference in such communication system. Examples of such beam diversity schemes are discussed in PCT/EP99/03093. Beam diversity involves transmitting the signal from the base transceiver station to the mobile station in more than one beam direction using for example a main beam and a diversity beam. The principal is that it is unlikely that both the main and diversity beams will suffer severe multi-path interference for a given signal. The mobile station is then arranged to select for processing the signal having the largest signal to noise ratio, or to combine the signal from both the main beam and diversity beam, resulting in an improved overall signal to noise ratio.

One of the access methods which is used in the IS-95 standard of the USA and which is currently proposed for the next generation standard is code division multiple access (CDMA). In CDMA mobile stations are distinguished by the spreading codes which they apply to the information to be transmitted. Likewise, signals intended for a given mobile station from a base station can be identified by the mobile station from the spreading codes applied to the signals. As a mobile station moves from one cell to another "soft handoff" is possible. Soft handoff is where a mobile station is in communication with two or more base stations at the same time. Typically, this will occur when a mobile station is in the region of two cells.

It is possible that a large number of mobile stations may be in soft handoff at any one time. In some situations, it is envisaged that, for example, 50% of the mobile stations will be in soft handoff.

It is known that a cell which is likely to contain a large number of mobile users, for example, a cell located within a densely population urban area, can be sub divided into a number of sectors. Although the cell has a single base transceiver station, separate antenna arrays are provided such that each sector of the cell is associated with a particular antenna array. Effectively each cell sector is analogous to a cell except that the base stations for adjacent cell sectors are in a single location. In this situation it is possible for a mobile station to be located on or near to the boundary between different sectors, in an analogous fashion to a mobile station which is located on the boundary between two different cells. In this case, the mobile station may receive simultaneous signals transmitted from each antenna array associated with the respective neighbouring sectors. The base stations at the same location may share information received from different antenna arrays. This is referred to as "softer handoff".

Clearly if a relatively large number of mobile stations are in soft or softer handoff, difficulties can arise if beamforming base stations are used as the number of beams transmitted by each base station may be increased. In CDMA systems code orthogonality is usually employed in the downlink signal from the base station to the mobile station in order to minimise the interference from other users in the same cell. However, this orthogonality is preserved only if the delay spread of the downlink channel is sufficiently small so that the channel can be characterised as a one-tap channel (this type of channel is often referred as a flat fading channel). This requirement means that in CDMA systems the delay spread must be much smaller than the chip duration. In one-tap channels the downlink diversity techniques give the best possible gains. In practice, especially in macro cells, the delay spread is often much greater than the chip duration and this leads to significant loss of orthogonality between the co-channel users. Such multitap channels already possess multipath diversity and therefore, increasing the number of downlink diversity beams from two to four does not produce significant excess diversity gain. On the contrary, increasing downlink beams in multitap channels severely destroys code orthogonality and results in performance loss. Accordingly, it is beneficial to reduce the number of downlink beams in soft or softer handover cases. It is therefore an aim of embodiments of the present invention to address this problem.

SUMMARY OF THE INVENTION

According to the present invention there is provided a method of directional wireless communication between a first station and a plurality of second stations, each of said second stations capable of transmitting a signal in a plurality of directions and with a selected polarisation, said method comprising: transmitting to said first station a first signal in a first one of said plurality of directions with a first polarisation only and transmitting to said first station a second signal in a second one of said plurality of directions with a second different polarisation only.

According to the present invention there is also provided a method of directional wireless communication between a first station and a plurality of second stations, each of said second stations capable of transmitting a signal in m different directions, where m is two or more, said method comprising: transmitting to said first station a signal from a first one of said second stations in n number of said directions, where $1 \leq n < m$; and transmitting to said first station said signal from a second one of said second stations in m-n of said directions, whereby the directions in which the signal is transmitted from said first one of said second station are substantially different from the directions in which the signal is transmitted form the second one of said second stations.

According to the present invention there is further provided a directional wireless communication system comprising: a first station; a plurality of second stations, each of said second stations being capable of transmitting a signal in a plurality of directions and with a selected polarisation; and control means, wherein said control means controls said plurality of second stations to transmit to said first station a first signal in a first one of said plurality of directions with a first polarisation only; and said control means controls said plurality of second stations to transmit to said first station a second signal in a second one of said plurality of directions with a second different polarisation only.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

For a better understanding of this present invention and as to how the same may be carried into effect, reference will now be made by way of example to the drawings in which:

FIG. 1b is a schematic view of the arrangement of two cells of the kind shown in FIG. 1a;

FIG. 5 shows schematically the base transceiver station of FIG. 1a.

DETAILED DESCRIPTION OF THE PRESENTLY PREFERRED EMBODIMENTS

Figure 1A:
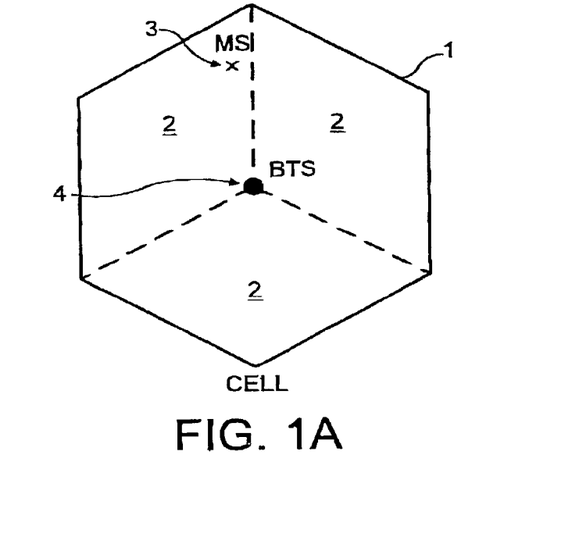
FIG. 1a is a schematic view of a base transceiver station and its associated cell sectors.

FIG. 1a shows a single cell 1 of a cellular mobile telephone network. The cell 1 is subdivided into three cell sectors 2, which are served by respective base transceiver stations (BTS) 4. Three separate base transceiver stations 4 are provided at the same location. Each BTS 4 has a transceiver, which transmits and receives signals to and from a respective one or the three cell sectors 2. Thus, one dedicated base transceiver station is provided for each cell sector 2. Each base transceiver station 4 is thus able to communicate with mobile stations (MS) 3 such as mobile telephones which are located in respective cell sectors 2.

Figure 1B:
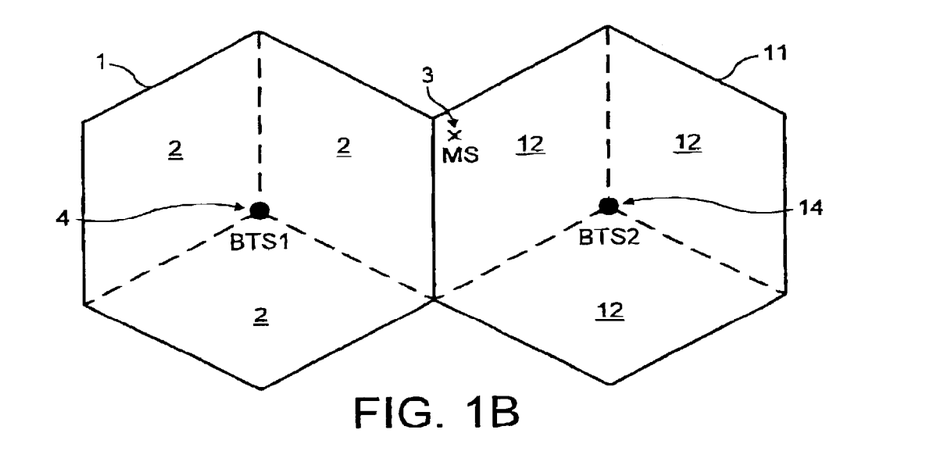

FIG. 1b shows the cell of FIG. 1a and one of its neighbouring cells 11. As shown in FIG. 1b, the first cell 1 and the second cell 11 are identical in structure, with the second cell 11 being subdivided into three sectors 12, each sector being served by a respective base transceiver station 14, each base transceiver station provided at the same location.

In a first example of wireless communication system, which is described in the context of a beamforming base station system, beam diversity is provided by using two beams, each of the beams having a different polarisation. The two beams are transmitted in the same beam direction.

Figure 2:
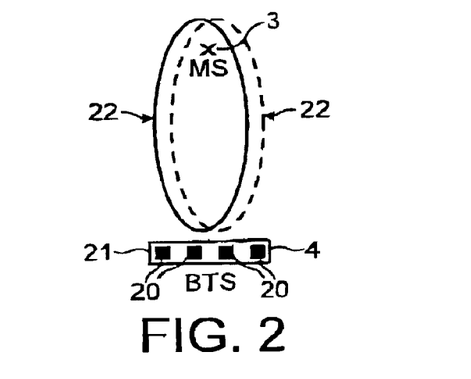
FIG. 2 is a schematic view of the antenna array of a base transceiver station and the main beam and polarised diversity beam transmitted to a mobile station.

FIG. 2 shows a schematic representation of a base transceiver station and mobile station. The base transceiver station 4 has an antenna array 21 having four dual polarised antennae 20 per sector. Two Butler matrices (which will described in more detail hereinafter) are provided. This means that the antenna array 21 is able to provide one set of four beam directions having a first polarisation and a second set of four beam directions having a second polarisation. Each set covers the entire area of a sector. The antenna array 21 is able to provide a first beam in a given direction having a first polarisation and a second beam having a second polarisation.

Slanted polarisation may be applied where each beam of each set is polarised by +/−45° so that the beams of the two sets are polarised by 90° with respect to each other.

It will be appreciated by those skilled in the art that different polarisation schemes can be used.

As each antenna array is capable of transmitting a first beam 21 and a second beam 22, beam diversity is achieved by virtue of the first and second beams haring different polarisations. As shown in FIG. 2 the mobile station 3 is located substantially centrally within the respective sector 2 and that therefore only a single base transceiver station 4 is required to transmit to the mobile station 3. The two polarised beams, the first beam 21 and the second beam 22, are transmitted to the mobile station in the same beam direction.

Figure 3:
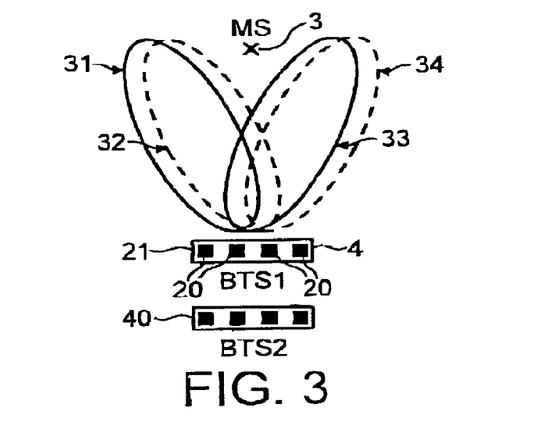
FIG. 3 is a schematic view of the antenna array shown in FIG. 2 and the transmitted beams during handoff.

With reference to FIG. 3, the mobile station 3 shown is now located substantially in the border region between two neighbouring sectors 2 within a single cell 1, as shown in FIG. 1a. In a CDMA system both of the base transceiver stations BTS1 and BTS2 of the respective neighbouring sectors 2 may transmit to the mobile station 3. This is softer handoff. As previously stated the individual base transceiver stations BTS1 and BTS2 or each sector are provided at the same location.

The antenna array 21 of the first base transceiver station BTS1 transmits a first beam 31 and a second beam 32 in the same direction. The first and second beams have different polarisation. The antenna array 40 of the second base station BTS2 transmits a first beam 33 and a second beam 34 to the mobile station in the same direction. Again, the two beams have different polarisation. The beams transmitted by the first and second base stations BTS1 and BTS2 are in different directions but may overlap partially. The mobile station will in practice be covered by at least one of the first and second base stations.

It will be appreciated that as each pair of beams from each respective base transceiver station BTS1 and BTS2 are being directed in similar directions to each other (i.e. with a degree of overlap) each co-polarised beam may be highly correlated with the other. That is to say the first beam 31 from the first base transceiver station BTS1 and the first beam 33 from the second base transceiver station BTS2 may be highly correlated and similarly the second beam 32 from the first base transceiver station BTS1 may be highly correlated with the second beam 34 from the second base transceiver station BTS2. The high correlation between respective beams produces the effect that the total transmitted power from the base transceiver stations BTS1 and BTS2 has to be increased, as the diversity gain is decreased due to the high correlation between the beams. This increased transmission power is not only wasteful in terms of the base transceiver stations output, but also increases interference with other users within the cells and in adjacent cells. Unnecessary power use in systems such as CDMA systems is disadvantageous as this increases the overall background interference level experienced by all of the mobile station users. In other words, the signal to noise ratio is reduced. By reducing the power that is used for the transmission of signals, the overall background interference level can be reduced. This means that an increase in the communication quality and/or capacity of the system can be achieved.

In one embodiment of the present invention, the amount of power with which each of the first and second beams is transmitted may be reduced by, for example, 50%.

Figure 4:
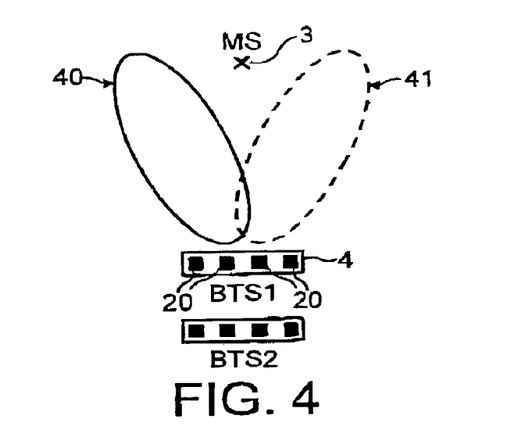
FIG. 4 is a schematic view of the antenna array of FIGS. 2 and 3 and the transmitted beams during handoff according to one embodiment of the present invention.

FIG. 4 shows a schematic representation of a transmission from a first base transceiver station BTS1 and a second transceiver station BTS2 for a mobile station 3 in accordance with an embodiment of the present invention. In the embodiment shown in FIG. 4 the mobile station 3 is located in the border region between two cell sectors 2, as shown in FIG. 1a and as described previously in relation to FIG. 3. However, as shown in FIG. 4, each base transceiver station only transmits a single beam. The first base transceiver station BTS1 is shown as transmitting a single beam 40 while the second base transceiver station BTS2 transmits a second beam 41 having a second, different polarisation. In this manner, the required beam diversity is maintained as two beams, polarised with respect to each other, are still transmitted. However, as only a single beam is transmitted from each base transceiver station, no correlation occurs between the two beams of the same polarisation but from different base stations as in the embodiment shown in FIG. 3 as the number of beams is reduced by a factor of two. The power of the resulting signal received at the mobile station 3 is less than that of the embodiment shown in FIG. 3. The arrangement shown in FIG. 4 ensures that only two beams are transmitted, with the different beams having different polarisation and being from different base transceiver stations.

Different beam selection schemes may be utilised, the schemes selected being based on certain criteria. A common scenario is that there are a large number of low-bit-rate users (speech calls are low-bit-rate). In this situation in embodiments of the present invention the beams transmitted by each base transceiver station are selected in accordance with a predetermined beam transmission sequence to reduce and average (pre-whiten) the interference to other co-channel users. For example, if a beam is represented by the notation $B_{s,p}$ where s is the sector number and p is the selected polarisation, then a suitable beam sequence would be:

$(B_{1,1}-B_{2,1})$, $(B_{1,2}-B_{2,1})$, $(B_{1,1}-B_{2,2})$, $(B_{1,2}-B_{2,2})$, $(B_{1,1}-B_{1,1}-B_{2,1})$,

This beam sequence provides that always one beam from each sector is transmitted. This beam sequence may be used for a given mobile station so that different parts of the transmission to the given mobile station are transmitted by different beams with different polarisations. Changing the beam transmitted by each base transceiver section throughout the transmission is known as "beam hopping". In the scenario with a large number of low-bit-rate users such beam hopping has the effect of averaging the interference to other cell users produced by the transmission and improves the signal to noise ratio for other users in the system.

In alternative embodiments of the invention, different users may be allocated different beam pairs. For example one user may use $B_{1,1}-B_{2,1}$ whilst another user may use $B_{1,2}-B_{2,1}$ and so on.

This may be appropriate if a number of users are located in the border region as more than one user may use the same beam pair at a given time.

If one sector is significantly more loaded than another adjacent sector, then a different strategy can be adopted. For example one sector may contain a large number of high-bit-rate users whereas the second neighbouring sector contains only low-bit-rate users. In this case the two beams transmitted to the mobile station in the border region of the two cell sectors are both transmitted from the sector with the lower loading. The beam selection sequence in this case would follow either $(B_{1,1}-B_{1,2})$ where the first sector has a lower loading or $(B_{2,1}-B_{2,2})$ where the second sector has a lower loading. This arrangement can be used wherever there is unequal loading in adjacent cell sectors, regardless of the cause.

Although embodiments of the present invention have been described in relation to "softer" handoff situations, it will be appreciated by those skilled in the art that the method of the present invention is equally applicable to soft handoff situations between neighbouring cells. The base stations in question would then be in different locations.

In a further embodiment of the present intention, the signals transmitted between the base stations and the mobile stations are encoded using Space-Time Codes Space-Time coding is a special case of transmission space diversity in which a number of signal beams are transmitted from a single base station, each beam signal being encoded using a 'different' spreading code. In fact the "different" codes are related such that actually only a single M×N Space-Time Code is used, where m is the number of transmission elements, and hence transmission beams, and n is the number of receiving elements at the receiver.

It is envisaged that in embodiments of the present invention using either beam polarisation of Space-Time Codes that softer handoff may be performed in the following manner. When the need for handoff between two cell sectors is identified, one of the two beams transmitted to the mobile station is transmitted from a second base station transceiver, as shown in FIG. 4, so that at least one beam is being transmitted from each of the two base station transceivers at any time. Once transmission from the second base station has been established satisfactorily, which may be determined, for example, by the received SNR at the mobile station, then the second transmission beam is also switched to being transmitted from the second base station transceiver, thus completing the handoff process.

The above example is limited to the situation where only two transmission beams are used. However, it can be envisaged that where Space-Time Coding is used, more than two beams may be employed in the transmission from the base station to the mobile station. In such a situation during handoff each beam is switched from the first base station transceiver to the second sequentially, thus providing a gradual handoff. Alternatively, where a number of beams are being transmitted, the beams may be switched from the first base station transceiver to the second in groups of beams, for example, in pairs.

Although the above process of gradual handoff has been described solely in relation to softer handoff, it will be appreciated by those skilled in the art that it is equally applicable to soft handoff.

An advantage of performing handoff in the above manner is that it enables the communication system to provide good signal quality for the downlink transmission to the mobile station, particularly when the mobile station is located within a fringe area between two cells or cell sectors. Good downlink transmission quality is especially desirable in communication systems with high rates of data transmission.

By reducing the transmission power during handoff, cellular communication systems utilising embodiments of the present invention can reduce the interference to other users and average the interference over time and space, both of which allow the capacity and/or quality of the communication system to be increased. Further advantages of the present invention are that the loading of each cell can be taken into account during handoff, which in turn allows for an increase in the capacity of communication system. Additionally no feedback signals are required from the mobile station in order to utilise embodiments of the present invention, so that all current mobile stations may utilise embodiments of the present invention.

A wireless communication system incorporating embodiments of the present invention may be particular suitable for, but not restricted to, wide band code division multiple access (WCDMA) systems which utilise outdoor base transceiver stations. In an outdoor system there is usually a considerable delay spread in the signals transmitted within each cell. The transmission channel between the base station and a mobile station can be regarded in this situation as a multi-tap channel and it therefore already has diversity in a single beam. Thus only providing two beams, as in embodiments of the present invention, still ensures beam diversity for good system performance. Embodiments of the present invention may also be used in systems which typically have a large number of high data rate users, for example, indoor wireless systems. Embodiments of the invention allow any interference to be whitened, i.e. averaged.

The structure of a base station which can be used in embodiments of the present invention will now be described with reference to FIG. 5.

Figure 5:
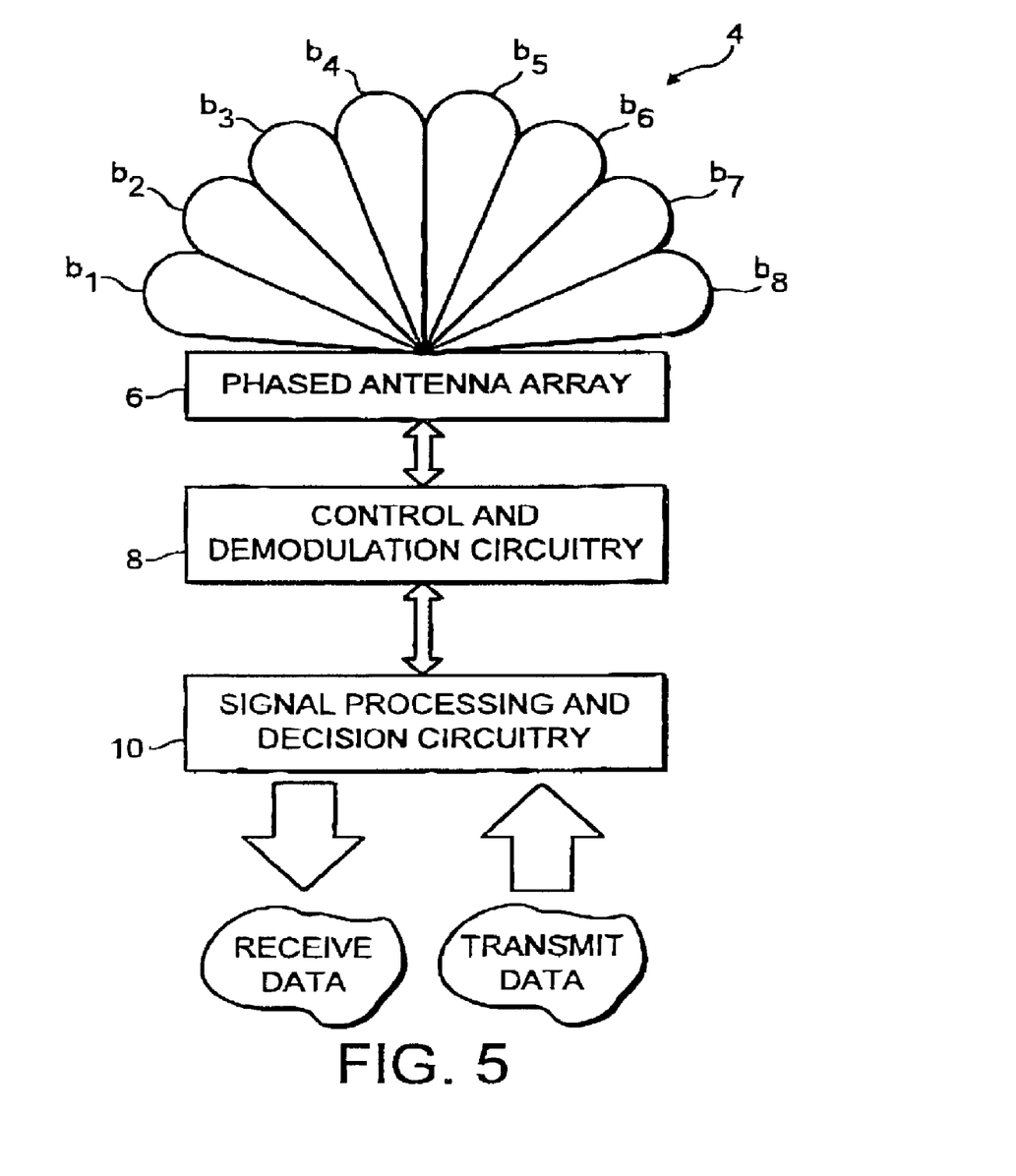

FIG. 5 shows a schematic view of a base transceiver station 4 suitable for code/time/frequency/space division multiple access systems. It should be appreciated that the various blocks illustrated in FIG. 5 do not necessarily correspond to separate elements of an actual base transceiver station for performing the method of the present invention. The various blocks illustrated in FIG. 5 correspond to various functions carried out by the base transceiver station. The base transceiver station 4 has an antenna array 6. The base station 4 only serves one of the three cell sectors 2 shown in FIG. 1a. Another two base stations 4 are provided to serve the other two cell sectors 2. In this example, the antenna array 6 has eight antenna elements. It will be appreciated that the antenna array may alternatively have another number of antenna elements, 4 or 10 for example. The elements are arranged to have a spacing of about a half wavelength between each antenna element and are arranged in a horizontal row in a straight line. Each antenna element is arranged to transmit and receive signals and can have any suitable construction. Each antenna element may be a dipole antenna, a patch antenna, a vertical stacked antenna, or any other suitable antenna. The eight antenna elements together define a phased antenna array 6.

As is known, each antenna element of the phased array antenna 6 is supplied with the same signal to be transmitted to a mobile station MS. However, the phases of the signals supplied to the respective antenna elements are shifted with respect to each other. The differences in the phase relationship between the signals supplied to the respective antenna elements gives rise to a directional radiation pattern. The antenna array 6 can be control-led to provide a beam $b_1$–$b_8$ in one or more of the eight directions illustrated. For example, the antenna array 6 could be controlled to transmit a signal to a MS only in the direction of beam $b_5$ or only in the direction of beam $b_6$ or in more than one beam direction at the same time. For example, a signal may be transmitted in the two directions defined by beam $b_5$ and beam $b_6$.

FIG. 5 is only a schematic representation of the eight possible beam directions that can be achieved with the antenna array 6. In practice, however, there will in fact be an overlap between adjacent beams. In some embodiments of the present intention, the width of the beams can be varied as well as the number of beams which are provided to cover a given area.

The control and demodulation circuitry B includes beamforming circuitry such as Butler matrix circuitry, amplifier stages, analogue-to-digital converter arrays and digital to analogue converter arrays. In the receive direction, the beam forming circuitry detects the phase difference between each of the signals received by the respective antenna elements and uses this information to determine the beam direction from which the signal has been received. Received signals are typically then passed through the amplifier stages to demodulation circuitry where the carrier frequency component is removed. The received analogue signal is converted to a digital signal and is output to the signal processing and decision circuitry 10. In the transmit direction, the relative phase of the signal supplied to each antenna element and thus also the desired beam direction is controlled by the beam forming circuitry. Before being supplied to the antenna elements digital data from the signal processing circuitry are converted to analogue signals and modulated onto the carrier frequency.

The signal processing and decision circuitry 10 removes the spreading codes from the received signal. The signal processing and decision circuitry determines the channel impulse response for the received signals from which parameters used to define a channel of the transmitted signals can be determined. The signal processing and decision circuitry 10 also carries out cross-correlation and analysis. Cross-correlation is used to generate taps which are representative of the channel impulse response for that correlation and compares received signals and stored information A channel impulse response is generated for each channel corresponding to a given communication burst received in each of the eight antenna directions $b_1$–$b_8$. A given communication burst may be received in one or more beam directions.

The analysis carried out within the signal processing and decision circuitry 11 is for determining and storing the maximum energy calculated from the channel impulse response. The signal processing and decision circuitry 10 also analyses the channel impulse responses to ascertain the minimum delay with which a given signal is received. The channel with the minimum delay may represent the line of sight path between a mobile station and its base transceiver station.

Decision circuitry of the signal processing and decision circuitry 10 compares the determined parameters for each channel to select transmission parameters for signals to be subsequently transmitted. The decision circuitry selects transmission parameters such as beam direction and power level based on information from the received signals. This selection can use simple methods for selection such as selecting the beam direction(s) having the maximum energy and minimum delay in the received signals. Alternatively, more complicated methods of selection may be used.

The embodiments shown in FIGS. 2, 3 and 4 have shown two antenna arrays. It should be appreciated that in actual embodiments of the invention, the arrays will usually be orientated in different directions to provide signal coverage in the required directions. However, in some alternative embodiments the arrays may be orientated in the same direction. Control of the area covered may be controlled by the Butler matrix or the like.

In the embodiments discussed hereinbefore, each antenna array is capable of transmitting beams having a first or a second polarisation. It should be appreciated that in alternative embodiments of the invention each array may be capable of providing more than two polarisations for example three or more.

In the above description analogue beamforming techniques have been assumed. However, digital beamforming techniques may also be applied e.g. to the baseband in signal processing and decision circuitry 10 of FIG. 5.

Whilst embodiments of the present invention have been described in relation to a CDMA system, embodiments of the present invention may be used with any other access methods such as time division multiple access systems (TDMA), frequency division multiple access (FDMA), other spread spectrum techniques or hybrids of any one or more of these techniques.

Embodiments of the present invention have been described where more than one base station is transmitting to a given mobile station at a time. However, embodiments of the present invention are also applicable where a single base station is transmitting to one mobile station. The two directions in which a signal is transmitted will use different polarisations.

Additionally embodiments of the present invention are applicable to wireless communication systems in which control signals transmitted from the mobile station to the base stations select the beam sequence transmitted by the base station.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method of directional wireless communication between a first station and a plurality of second stations, each of said second stations capable of transmitting a signal in a plurality of beam directions and with a selected polarisation, said method comprising:

transmitting from a first one of said second stations to said first station a first signal in a first one of said plurality of directions with a first polarisation only; and transmitting from a second one of said second stations to said first station a second signal in a second one of said plurality of directions with a second different polarisation only, wherein said first signal and said second signal are transmitted in accordance with a selected sequence represented by the notation $B^n_{s,p}$, where n denotes the first or second signal, s denotes an area associated with each said second stations, and p denotes the polarisation, and said sequence is $(B^1_{1,1}-B^2_{2,1})$, $(B^1_{1,2}-B^2_{2,1})$, $(B^1_{1,1}-B^2_{2,2})$, $(B^1_{1,2}-B^2_{2,2})$.

2. The method of claim 1, wherein only said first and second signals are transmitted to said first station.

3. The method of claim 1, wherein said sequence is selected in dependence on loading of communication sectors in which each of the second stations are located.

4. The method of claim 1, wherein said sequence is selected when each of said respective communication sectors is loaded substantially equally.

5. The method of claim 1, wherein said first signal and said second signal are polarised at 90° with respect to each other.

6. A method of directional wireless communication between a first station and a plurality of second stations, each of said second stations capable of transmitting a signal in m different directions, where m is two or more, said method comprising:

transmitting to said first station a signal from a first one of said second stations in n number of said directions, where $1 \leq n < m$; and transmitting to said first station said signal from a second one of said second stations in m-n of said directions, wherein the directions in which the signal is transmitted from said first one of said second stations are substantially different from the directions in which the signal is transmitted from the second one of said second stations.

7. The method of claim 6, further comprising the subsequent steps of:

decreasing by a first number which is at least one of the number of directions in which said signal is transmitted to said first station from the first one of the second stations;

increasing by the first number the number of directions in which said signal is transmitted to said first station from the second one of the second stations; and repeating said previous steps until said signal is transmitted in m directions from said second one of the second stations only.

8. The method of claim 1, wherein each of said second stations are associated with respective areas.

9. The method of claim 8, wherein said first station is located within a border region between the areas associated with each said respective second station.

10. The method of claim 1, wherein said first station is a mobile station.

11. The method of claim 1, wherein the method is performed in a CDMA communications system.

12. The method of claim 6, wherein the method is performed in a wireless communications system utilizing Space-Time coding.

13. The method of claim 2, wherein said first signal is transmitted from a first one of said second stations and said second signal is transmitted from a second one of said second stations.

14. The method of claim 2, wherein said first signal and said second signal are transmitted from the same one of said second stations.

15. The method of claim 2, wherein said first signal and said second signal are transmitted in accordance with a selected sequence.

16. The method of claim 7, wherein the method is performed in a wireless communications system utilizing Space-Time coding.

17. The method of claim 8, when used wherein the method is performed in a wireless communications system utilizing Space-Time coding.

18. The method of claim 9, wherein the method is performed in a wireless communications system utilizing Space-Time coding.

19. The method of claim 10, wherein the method is performed in a wireless communications system utilizing Space-Time coding.

20. A method of directional wireless communication between a first station and a plurality of second stations, each of said second stations being configured to transmit a signal in a plurality of beam directions and with a selected polarisation, said method comprising:

transmitting to said first station a first signal in a first one of said plurality of beam directions with a first polarisation only; and transmitting to said first station a second signal in a second one of said plurality of beam directions with a second different polarisation only, wherein said first signal and said second signal are transmitted from an identical one of said second stations, and said first signal and said second signal are transmitted in accordance with a selected sequence represented by the notation $B^n_{s,p}$, where n denotes the first or second signal, s denotes an area associated with each of said second station, and p denotes the selected polarisation, and said sequence is $(B^1_{1,2} - B^2_{1,1})$.

21. The method of claim 20, wherein said sequence is selected when one of said respective communication sectors is more heavily loaded than the other respective communication sector.

22. The method of claim 20, wherein said sequence is selected in dependence on loading of communication sectors in which each second station is located.

23. A method of directional wireless communication between a first station and a plurality of second stations, each of said second stations being configured to transmit a signal in a plurality of beam directions and with a selected polarisation, said method comprising:

transmitting to said first station a first signal in a first one of said plurality of directions with a first polarisation only; and transmitting to said first station a second signal in a second one of said plurality of directions with a second different polarisation only, wherein said first signal and said second signal are transmitted from an identical one of said second stations, and said first signal and said second signal are transmitted in accordance with a selected sequence represented by the notation $B^n_{s,p}$, where n denotes the first or second signal, s denotes an area associated with each said second station, and p denotes the polarisation, and said sequence is $(B^1_{2,1} - B^2_{2,2})$.

24. The method of claim 23, wherein said sequence is selected in dependence on loading of communication sectors in which each second station is located.

25. The method of claim 23, wherein said sequence is selected when one of said respective communication sectors is more heavily loaded than the other respective communication sector.

26. A directional wireless communication system comprising:

a first station;

a plurality of second stations, each of said second stations being configured to transmit a signal in a plurality of beam directions and with a selected polarisation; and control means, wherein said control means controls said plurality of second stations to transmit from a first one of said second stations to said first station a first signal in a first one of said plurality of directions with a first polarisation only, and wherein said control means controls said plurality of second stations to transmit from a second one of said second stations to said first station a second signal in a second one of said plurality of directions with a second different polarisation only, and wherein said first signal and said second signal are transmitted in accordance with a selected sequence represented by the notation $B^n_{s,p}$, where n denotes the first or second signal, s denotes an area associated with each said second station, and p denotes the polarisation, and said sequence is $(B^1_{1,1} - B^2_{2,1})$, $(B^1_{1,2} - B^2_{2,1})$, $(B^1_{1,1} - B^2_{2,2})$, $(B^1_{1,2} - B^2_{2,2})$.

27. The communication system of claim 26, wherein each second station comprises at least one antenna array, each array having a plurality of antennae.

28. The communication system of claim 27, wherein each antenna array is configured to transmit a first signal having a first polarisation and a second signal having a second polarisation.

29. The communication system of claim 28, wherein each antenna array is configured to transmit said first and second signals in any one of a plurality of directions.

30. The communication system of claim 27, wherein said first and second signals are polarised by 90° with respect to each other.

31. The communication system of claim 26, wherein each at least one antenna array comprises four antennae.

32. The communication system of claim 26, wherein each at least one antenna is a dual polarised antenna.

33. The communication system of claim 29, wherein said first and second signals are polarised by 90° with respect to each other.

34. A directional wireless communication system comprising:
   a first station;
   a plurality of second stations, each of said second stations being configured to transmit a signal in a plurality of beam directions and with a selected polarisation; and
   control means, wherein said control means controls said plurality of second stations to transmit to said first station a first signal in a first one of said plurality of beam directions with a first polarisation only, and wherein said control means controls said plurality of second stations to transmit to said first station a second signal in a second one of said plurality of beam directions with a second different polarisation only, and
   wherein said first signal and said second signal are transmitted from an identical one of said second stations, and said first signal and said second signal are transmitted in accordance with a selected sequence represented by the notation $B^n_{s,p}$, where n denotes the first or second signal, s denotes an area associated with each said second station, and p denotes a polarisation, and said sequence is $(B^1_{1,2}-B^2_{1,1})$.

35. The communication system of claim 34, wherein each second station comprises at least one antenna array, each said array having a plurality of antennae.

36. The communication system of claim 35, wherein each antenna array is configured to transmit a first signal having a first polarisation and a second signal having a second polarisation.

37. The communication system of claim 36, wherein each antenna array is configured to transmit said first and second signals in any one of a plurality of directions.

38. The communication system of claim 36, wherein said first and second signals are polarised by 90° with respect to each other.

39. The communication system of claim 35, wherein each antenna array comprises four antennae.

40. The communication system of claim 35, wherein each antenna is a dual polarised antenna.

41. The communication system of claim 34, wherein said first and second signals have a polarised by 90° with respect to each other.

42. A directional wireless communication system comprising:
   a first station;
   a plurality of second stations, each of said second stations being configured to transmit a signal in a plurality of beam directions and with a selected polarisation; and
   control means, wherein said control means controls said plurality of second stations to transmit to said first station a first signal in a first one of said plurality of directions with a first polarisation only, and wherein said control means controls said plurality of second stations to transmit to said first station a second signal in a second one of said plurality of directions with a second different polarisation only,
   wherein said first signal and said second signal are transmitted from an identical one of said second stations, and wherein said first signal and said second signal are transmitted in accordance with a selected sequence represented by the notation $B^n_{s,p}$, where n denotes the first or second signal, s denotes an area associated with each said second station, and p denotes the polarisation, and said sequence is $(B^1_{2,1}-B^2_{2,2})$.

43. The communication system of claim 42, wherein each second station comprises at least one antenna array, each said array having a plurality of antennae.

44. The communication system of claim 43, wherein each antenna array is configured to transmit a first signal having a first polarisation and a second signal having a second polarisation.

45. The communication system of claim 44, wherein each antenna array is configured to transmit said first and second signals in any one of a plurality of directions.

46. The communication system of claim 44, wherein said first and second signals are polarised by 90° with respect to each other.

47. The communication system of claim 43, wherein each antenna array comprises four antennae.

48. The communication system of claim 43, wherein each antenna is a dual polarised antenna.

49. The communication system of claim 45, wherein said first and second signals are polarised by 90° with respect to each other.

* * * * *